Feb. 9, 1954  E. J. KELLER  2,668,360
HEADSPACE GAUGE FOR FIREARMS
Filed March 6, 1950
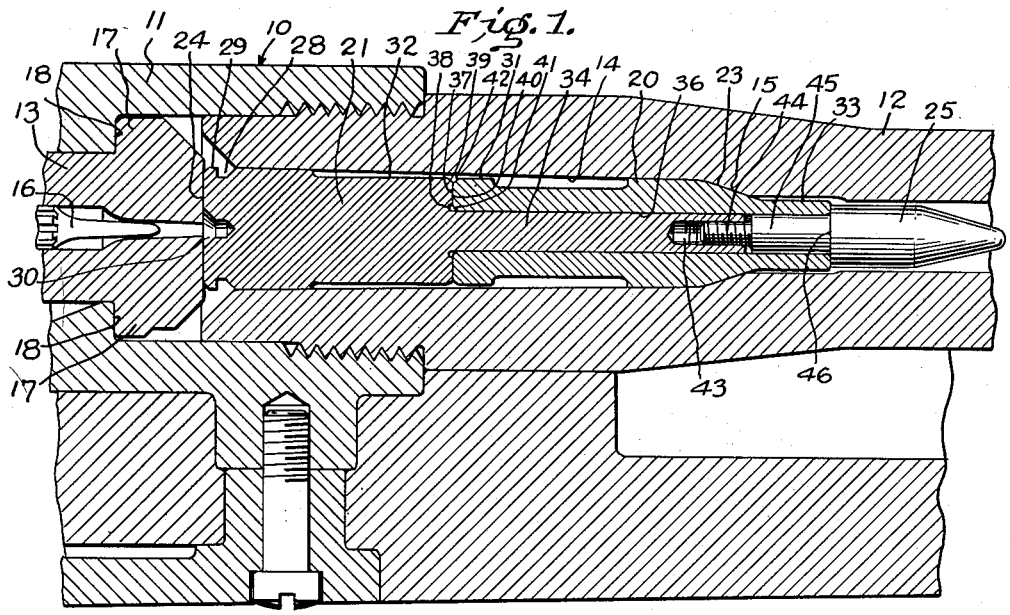
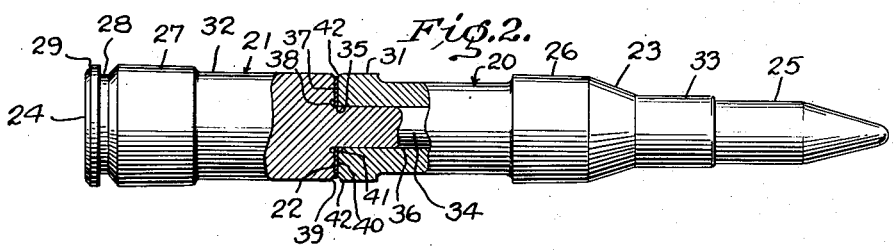
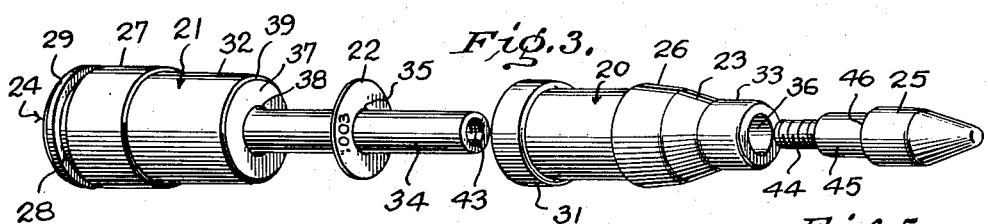
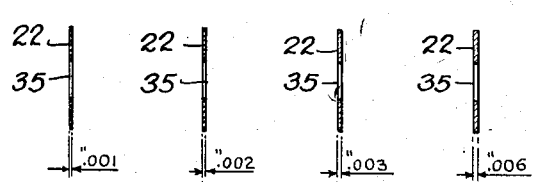
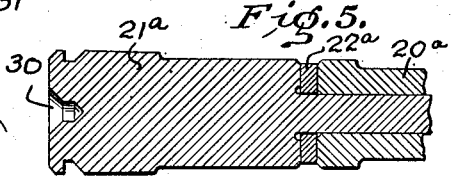
*Ervin J. Keller*
INVENTOR
BY *Reginald W. Hoagland*
ATTORNEY Patented Feb. 9, 1954

2,668,360

UNITED STATES PATENT OFFICE 2,668,360

HEADSPACE GAUGE FOR FIREARMS

Ervin J. Keller, Flint, Mich.

Application March 6, 1950, Serial No. 147,988

3 Claims. (Cl. 33—168)

This invention relates to gauges and more particularly to headspace gauges used to determine the distance between the cartridge seat in the chamber of the barrel and the face of the bolt of the breech mechanism of a firearm.

Heretofore, the general practice has been to merely check a firearm for excessive headspace to learn if it is safe to fire, one way being to use a number of separate gauges, each a complete gauge in itself, ground and lapped to an exact size and each differing in length by only several thousandths of an inch, while another way has been to use a micrometer type of gauge adjustable to different lengths. The first-mentioned method is merely a check for safety and not a reading of the actual headspace unless there is available a considerable number of gauges slightly and evenly graduated in size which are very costly to produce. The second-mentioned method has not proved satisfactory because the fine threads for adjustment cannot withstand the force produced by the camming action in locking a breech mechanism in closed position on the gauge. For this reason, most gunsmiths never completely close the breech on the gauge, thus an accurate reading is not obtained. Furthermore, if the firearm is of the type having a bolt that rotates into and out of locked position, such rotation of the bolt while in contact with the gauge could change the reading of the gauge from that of the actual headspace.

It is therefore proposed to provide a novel and improved headspace gauge which is adjustable in length, which will not be deformed and rendered inaccurate, which the adjusted position thereof will not be changed upon the closing and opening of a breech mechanism thereon, which is simple and substantial in construction, which can be manufactured economically, and which will be thoroughly efficient and practical in use.

More specifically, it is an important object of the invention to provide a considerable number of inexpensive spacer shims of different thicknesses, any one of which or a combination thereof to be positioned between surfaces of a forward and a rearward section of the gauge for changing the measurement between the gauging surfaces on said forward and rearward sections.

Another object of the invention is to provide a headspace gauge in accordance with the preceding objects wherein assembled parts comprising a complete gauge of a certain size are attached as a single unit when measuring a headspace and having said parts arranged and attached in such a manner that the adjustment or attachment thereof will not be affected by bolt-locking pressures.

A further object of the invention is to provide a recess in the center of the base of the gauge that contacts the face of the bolt to prevent harm to the firing pin should the same be released with the gauge in the chamber and the bolt in locked position thereon.

These, together with various auxiliary features and objects of the invention which will later become apparent as the following description proceeds, are attained by the present invention, a preferred embodiment of which has been illustrated, by way of example only, in the accompanying drawings, wherein:

Figure 1 is a longitudinal section through the gauge showing the same in the chamber of a barrel with a breech mechanism in closed position thereon;

Figure 2 is a side elevation of the gauge with portions in section showing a shim assembled therewith;

Figure 3 is an exploded view of the gauge as shown in Figure 2;

Figure 4 consists of sectional views through a group of shims of different thicknesses; and Figure 5 is a longitudinal section through the rear portion of the gauge, showing a modified form of the invention where shims of greater thicknesses are used for convenience in handling.

Referring now more specifically to the accompanying drawings, wherein like numerals designate similar parts throughout the various views, attention is directed first to Figure 1, wherein it will be seen that there is indicated at 10 the breech portion of a gun having the customary receiver 11 into which is threaded and rigidly supported a barrel 12 and in which is slidably mounted the bolt 13 of a breech mechanism. The barrel 12 has the usual chamber 14 with tapered end shoulder 15 thereon for the purpose of seating cartridges thereagainst, while the bolt 13 is shown as having the usual firing pin 16 mounted therein and as being the rotating type having forward locking lugs 17 that engage the locking surfaces 18 of the receiver and cam the bolt to closed position on a cartridge in the chamber upon rotation of the bolt.

The improved gauge forming the subject of this invention is composed of two sections, a forward section 20 and a rearward section 21, assembled end to end and abutting each other are spacers 22 of known thicknesses therebetween abutted by both sections for varying the distance between the gauging surface 23 of the forward section 20 and the gauging surface 24 of the rearward section 21. A nosepiece 25 forward of both gauging surfaces is provided for attaching the sections 20 and 21 together and to aid in feeding the gauge into the chamber of the barrel.

When the sections 20 and 21 are assembled without a spacer shim 22, as shown in Figure 1, the shape and size of certain areas of the outer surfaces of the combined parts are the same as that of a perfect cartridge case, such surfaces being located at the forward portion of the forward section 20 and at the rearward portion of the rear section 21 for contacting surfaces in the chamber of the barrel and on the face of the bolt. The forward section 20, in addition to having the tapered seating surface 23 which engages the shoulder 15 of the chamber identical to that of a cartridge case, has a short surface portion 26 adjacent said surface 23 also the same as a cartridge case for surface contact with the forward portion of the slightly tapered cylindrical wall of the barrel chamber, while another short surface portion 27 for a like purpose is provided on the rearward section 21 at its rear portion which, together with said first-mentioned short portion, supports the gauge directly in the center of the chamber.

The rear section 21 has the usual extraction groove 28 and flange 29 as those used on rimless cartridge cases for the purpose of feeding and extracting the gauge into and out of the barrel upon actuation of the breech mechanism. Should, for any reason, the trigger, not shown, be pulled and the firing pin 16 released when the breech mechanism is in closed position of the gauge, a recess 30 is provided in the center of the base 24 of the section 21 into which the point of the firing pin may extend and thus eliminate the danger of damage to the firing pin.

The areas 31 and 32 of the sections 20 and 21, respectively, which lie between the chamber-contacting portions 26 and 27, as well as the portion 33 of the section 20 forwardly of the tapered seating surface 23, are relieved from contact with the barrel to avoid unnecessary expense in fitting such portions to exact size.

For detachably supporting the sections 20 and 21, and any shims 22 that may be positioned therebetween as a single unit on a common center, the rear section 21 has a cylindrical reduced extension 34 projecting forwardly therefrom which is adapted to extend through a central hole 35 in each of the spacer shims 22 when used and into a central bore 36 provided in the forward gauge section 20.

The extension 34 projects forwardly through the center of a flat circular abutment face 37 on the rear section 21 and is slightly cut away by the undercut 38 where it joins the extension 34 and by the chamfered edge 39 at its periphery, while the rear end of the section 20 through which the bore 36 extends is flattened to provide a circular abutment face 40 which is also slightly cut away by chamfering the edges at the inner diameter, as at 41, and the outer diameter, as at 42.

Provided in the forward end of the reduced extension 34 of the rear section 21 is an internally threaded hole 43 into which is received the threaded reduced end 44 of an extension 45 on the nosepiece 24 for attaching the gauge parts together. The extensions 34 and 45 are both of the same diameter and are closely fitted to the surface of the bore 36 in the forward section 20 for proper alignment of parts, and are of a combined length slightly less than the length of the forward section 20 for engaging the shoulder 46 of said nosepiece with the forward end of the section 20 with or without spacer shims between the two sections. By threadably attaching the nosepiece 25 to the extension 34 in this manner, the threads do not interfere with the sliding of thin, delicate spacer shims over the end of the extension as would be the case with external threads on the extension 34.

Figure 4 shows four spacer shims dimensioned as being .001", .002", .003", and .006" thick for the purpose of illustrating how a small number of spacer shims can be used singularly or together to adjust the gauge to measure in thousandths up to and including twelve thousandths of an inch.

In the form of invention illustrated in Figures 1 through 4, the gauge without a spacer shim 22 thereon is of identical minimum measurements as that of a perfect cartridge case, and should a firearm not completely close thereon, the firearm would not close on a correct size cartridge and could not be fired. It is assumed that all firearms have either the correct amount of headspace or excessive headspace, and it is the amount of excessive headspace that is desired to be known. To increase the distance between the seat 23 and the base 24 of the gauge, shims are either added or changed equal each time to an additional one thousandth of an inch after each complete closing of the breech on the gauge until the breech fails to completely close. The headspace can be determined by referring back to the thickness of shims used in the last complete closing of the breech of the firearm. While I have shown and described the gauge as being adjustable to within one thousandth of an inch, it is to be understood that shims differing in thickness of a lesser amount may be used in obtaining a greater degree of accuracy should it be desired.

The form of invention shown in Figure 5 is for the purpose of dispensing with the use of spacer shims of very thin thicknesses identical to the small differences of measurements to be made, and thereby use spacers that do not require such careful handling to keep from damaging same. In this case, the numeral 22ª designates a relatively thick spacer shim, while 20ª and 21ª indicate the forward and rearward gauge sections, respectively, which will require that either or both sections 20ª and 21ª be shortened over that shown in the other form of invention a distance equal to the increase of thickness of all shims. With the use of such spacer shims, it will be necessary to always use a shim with the gauge sections and a different one for each measurement.

The manner in which the different parts of the gauge are constructed and associated with one another produces a construction whereby tremendous breech closing pressures can be applied to the gauge without distorting the gauge parts, and thereby permit the breech mechanism of a firearm to be completely closed on the gauge when conducting measurements. Nor will a rotation of the bolt to or from locked position have any effect to increase or decrease the length of the gauge between the gauging surfaces thereof, thus it can be seen that a thoroughly efficient and practical gauge is produced.

In view of the foregoing description taken in conjunction with the accompanying drawings, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. A headspace gauge for measuring the distance from the face of the bolt of a closed breech mechanism to the shoulder in the chamber of a barrel against which cartridges are seated when determining the headspace of a firearm, said gauge comprising forward and rearward gauge sections, said forward section having a gauging surface thereon for engaging the shoulder in the chamber, said rearward section having a gauging surface thereon for engaging the face of the bolt, each of said gauge sections also having a flat abutment surface thereon, said forward section also having an opening at the center of its abutment surface and extending longitudinally therethrough; a reduced extension projecting forwardly from the center of the abutment surface of said rearward section and slidably received in the opening of the forward section; spacer shims of different thicknesses, each spacer shim having a central hole through which said reduced extension is adapted to extend when said shim is positioned between the abutment faces of the forward and rearward sections; and a nosepiece threadably connected to the forward end of said reduced extension and engageable with said forward gauge section for sliding said forward gauge section relative to said reduced extension upon turning movement of said nosepiece and thereby drawing said gauge sections towards one another and determining the spacing of said gauging surfaces by a clamping of said abutting surfaces of both sections against one another or against shims interposed between said abutment surfaces.

2. A headspace gauge for measuring the distance from the face of the bolt of a closed breech mechanism to the shoulder in the chamber of a barrel against which cartridges are seated when determining the headspace of a firearm, said gauge comprising forward and rearward gauge sections, said forward section having a gauging surface thereon for engaging the shoulder in the chamber, said rearward section having a gauging surface thereon for engaging the face of the bolt, each of said gauge sections also having a flat abutment surface thereon, said forward section also having an opening at the center of its abutment surface and extending longitudinally therethrough; a reduced extension projecting forwardly from the center of the abutment surface of said rearward section and received in the opening of the forward section, said extension having an opening with internal screw threads at the end thereof; spacer shims of different thicknesses, each spacer shim having a central hole through which said reduced extension is adapted to extend when said shim is positioned between the abutment faces of the forward and rearward sections; a nosepiece positioned forwardly of and engageable with said forward section; and a reduced, externally threaded end on said nosepiece for detachably connecting the same to said reduced extension.

3. A headspace gauge for measuring the distance from the face of the bolt of a closed breech mechanism to the shoulder in the chamber of a barrel against which cartridges are seated when determining the headspace of a firearm, said gauge comprising forward and rearward gauge sections, said forward section having a gauging surface thereon for engaging the shoulder in the chamber, said rearward section having a gauging surface thereon for engaging the face of the bolt, each of said gauge sections also having a flat abutment surface thereon, said forward section also having an opening at the center of its abutment surface and extending longitudinally therethrough; a reduced extension projecting forwardly from the center of the abutment surface of said rearward section and received in the opening of the forward section, said extension having an opening with internal screw threads at the end thereof; spacer shims of different thicknesses, each spacer shim having a central hole through which said reduced extension is adapted to extend when said shim is positioned between the abutment faces of the forward and rearward sections; a nosepiece positioned forwardly of and engageable with said forward section; a rearward extension on said nosepiece received in the opening of said forward section; and a reduced, externally threaded end on said nosepiece for threadably engaging the internal threads on the end of the reduced extension of the rearward section.

ERVIN J. KELLER.

References Cited in the file of this patent

UNITED STATES PATENTS

| Number | Name | Date |
|---|---|---|
| 1,256,255 | Porter | Feb. 12, 1918 |
| 1,351,721 | Eickhoff et al. | Aug. 31, 1920 |
| 1,435,525 | Johannsson | Nov. 14, 1922 |
| 1,514,250 | Briney | Nov. 4, 1924 |
| 2,371,302 | Lester | Mar. 13, 1945 |
| 2,469,502 | Hallin | May 10, 1949 |
| 2,497,196 | Woodward | Feb. 14, 1950 |